United States Patent [19]

Kirihara et al.

[11] Patent Number: 4,925,537
[45] Date of Patent: May 15, 1990

[54] PROCESS FOR SEPARATION OF HAFNIUM TETRACHLORIDE FROM ZIRCONIUM TETRACHLORIDE AND ELECTRODE

[75] Inventors: Tomoo Kirihara, Hirakocho-Higashi; Ippei Nakagawa, Aichi; Yoshinobu Seki, Ibaraki; Yutaka Honda, Ibaraki; Yasuo Ichihara, Ibaraki, all of Japan

[73] Assignee: Mitsubishi Nuclear Fuel Company, Ltd., Tokyo, Japan

[21] Appl. No.: 330,893

[22] Filed: Mar. 31, 1989

[30] Foreign Application Priority Data

Apr. 1, 1988 [JP] Japan .................... 63-80416

[51] Int. Cl.$^5$ .................... C25B 1/26; C25B 11/04
[52] U.S. Cl. .................... 204/61; 204/291; 204/294
[58] Field of Search ............ 204/61, 64 T, 291, 294

[56] References Cited

U.S. PATENT DOCUMENTS

| | | | |
|---|---|---|---|
| 2,941,931 | 6/1960 | Dean | 204/61 |
| 3,003,890 | 10/1961 | Dean | 204/61 X |
| 3,600,284 | 8/1971 | Martinez | 204/64 T X |
| 4,857,155 | 8/1989 | Kirihara et al. | 204/61 |

Primary Examiner—Donald R. Valentine
Attorney, Agent, or Firm—James Creighton Wray

[57] ABSTRACT

A process for separation of hafnium tetrachloride from zirconium tetrachloride and electrode is disclosed. Zirconium tetrachloride containing hafnium tetrachloride in natural ratio dissolved in a molten salt is reduced in the first phase electrolysis using an anode composed of a substance formed by firing a mixture of more than one kind of compound selected from the group consisting of silica, silicate containing zirconium or zirconium oxide and carbon with a binder under maintenance of an initial concentration of the zirconium tetrachloride in order to produce zirconium trichloride containing a hafnium content lower than that of the zirconium tetrachloride at a cathode. Next, by using the former cathode as an anode and another cathode in the second phase electrolysis the zirconium tetrachloride is further reduced to yield zirconium trichloride of a lower hafnium content at another cathode and evolve on the anode gaseous zirconium tetrachloride having a high pressure by oxidizing the zirconium trichloride produced in the first phase electrolysis. The evolved zirconium tetrachloride is recovered as zirconium tetrachloride with a low hafnium content. Further, the zirconium tetrachloride with a low hafnium content and the zirconium trichloride with a lower hafnium content are produced by exchanging polarities of the cathode and the anode when the zirconium trichloride on the anode decreases. The second phase electrolysis is carried out repeatedly. After hafnium tetrachloride is concentrated to an expected value in the molten salt in the above mentioned electrolysis, the molten salt is transferred to a separate vessel and is heated to evaporate the tetrachloride highly concentrated hafnium. Thus, zirconium tetrachloride and hafnium tetracholoride are respectively separated with high efficiency. A hafnium content of zirconium tetrachloride separated is able to reduce to less than 100 ppm, and a zirconium content of hafnium tetrachloride separated is also reduced to less than 25 wt %.

4 Claims, 3 Drawing Sheets

PROCESS FOR SEPARATION OF HAFNIUM TETRACHLORIDE FROM ZIRCONIUM TETRACHLORIDE AND ELECTRODE

BACKGROUND OF THE INVENTION

The present invention relates to a process for separation of hafnium tetrachloride from zirconium tetrachloride and electrode which produces zirconium tetrachloride with a low hafnium content suitable for a raw material of the production of zirconium metal of reactor grade and hafnium tetrachloride with a high hafnium content suitable for a raw material of hafnium metal with high efficiency respectively.

Zirconium ore contains generally about 2~4 wt % of hafnium. Conventionally in commercial processes for separation of hafnium from zirconium there are a solvent extraction process which uses zirconium tetrachloride as a starting material and hexon as a solvent (J. W. Ramsey, W. K. Whitson Jr.: Production of zirconium at Y-12, AEC Report Y-817, October 12, 1951) and a distillation process (Paul Benson, Jean Guerin, Pierre Brun, Michel Bakes: French Patent No. 7340395, Japanese Patent Publication No. 20279 of 1978, Pierre Brun, Jean Guerin: Japanese Patent Provisional Publication No. 184732 of 1984).

In the former the running cost is high owing to its low recovery of solvent and chemicals used. In the latter the running cost is low, however, a huge distiller is required and its maintenance cost is high. As a patent somewhat related to the present invention, there is a process in which zirconium tetrachloride is reduced to trichloride by the use of a reducing agent to be separated by distillation (I. E. Newnham: U.S. Pat. No. 2,791,485, May 7, 1957), but this process is not yet commercialized owing to the difficulty in separation of the reducing agent.

On the other hand, as mentioned above, zirconium ore contains about 2~4 wt % of hafnium. As hafnium tetrachloride is slightly more stable than zirconium tetrachloride for the chlorination reaction of both oxides, the concentration of hafnium tetrachloride in the chlorides is almost the same as that of the ore. Zirconium tetrachloride containing hafnium tetrachloride in natural retio is a starting material for production of zirconium and hafnium metals. As the thermal neutron absorption cross section of hafnium is high, a hafnium content in zirconium used for a reactor must be less than 100 ppm. Besides, hafnium is an excellent control material for a reactor because of its high absorption of neutron.

BRIEF SUMMARY OF THE INVENTION

An object of the present invention is to provide a process for separation of hafnium tetrachloride from zirconium tetrachloride and electrode in which zirconium and hafnium are separated respectively from zirconium tetrachloride containing hafnium tetrachloride in natural ratio and zirconium tetrachloride with a hafnium content of less than 100 ppm and hafnium tetrachloride with a zirconium content of less than 25 wt % are obtained as products.

The present invention provides a process for separation of hafnium tetrachloride from zirconium tetrachloride comprising the following steps:

(a) dissolving zirconium tetrachloride containing hafnium tetrachloride in natural ratio in a molten salt, (b) producing zirconium trichloride containing a lower hafnium content than that of said zirconium tetrachloride at a cathode by electrolytic reduction of said zirconium tetrachloride in said molten salt using a substance formed by firing a mixture of more than one kind of compound selected from the group consisting of silica, silicate containing zirconium or zirconium oxide and carbon with a binder as an anode.

The present invention provides further a process for separation of hafnium tetrachloride from zirconium tetrachloride comprising the following steps:

(a) dissolving zirconium tetrachloride containing hafnium tetrachloride in natural ratio in a molten salt, (b) producing zirconium trichloride containing a lower hafnium content than that of said zirconium tetrachloride at a cathode by the first phase electrolytic reduction of said zirconium tetrachloride in said molten salt using a substance formed by firing a mixture of more than one kind of compound selected from the group consisting of silica, silicate containing zirconium or zirconium oxide and carbon with a binder as an anode under maintenance of an initial concentration of said zirconium tetrachloride by supplying said tetrachloride to said molten salt, (c) next, using as an anode said cathode on which said zirconium trichloride was produced in the former electrolytic reduction and another cathode, (d) produceing said zirconium trichloride with a lower hafnium content at said another cathode by the second phase electrolytic reduction of said zirconium tetrachloride in keeping a cocentration of said zirconium tetrachloride in said molten salt by supplying said tetrachloride in a similar manner as in the first phase electrolytic reduction and at the same time evolving gaseous zirconium tetrachloride with a high pressure at the anode by oxidizing said zirconium trichloride which was produced in the former electrolytic reduction, (e) recovering said evolved zirconium tetrachloride as zirconium tetrachloride with a low hafnium content, (f) further producing said zirconium trichloride with a lower hafnium content at the cathode and said zirconium tetrachloride with a low hafnium content at the anode by exchanging polarities of said cathode and said anode when said zirconium trichloride on said anode decreases, (g) subsequently repeating continuously the second phase electrolysis similar to above, (h) on the other hand, transferring said tetrachloride highly concentrated hafnium in said molten salt to a separate vessel at the end of said second phase electrolytic reduction when a vapor pressure of hafnium tetrachloride reaches an expected value less than about 1/10 of an equilibrium pressure of said zirconium tetrachloride in said molten salt at the temperature of said molten salt, and (i) separating said tetrachloride highly concentrated hafnium from said molten salt by temperature rise of said molten salt transferred already to said separate vessel.

The molten salt used in the present invention is composed of alkali metal chlorides (LiCl, NaCl, KCl, RbCl, CsCl), alkaline earth chlorides ($BeCl_2$, $MgCl_2$, $CaCl_2$, $SrCl_2$, $BaCl_2$), and/or alkali metal fluorides (LiF, NaF, KF, RbF, CsF), alkaline earth fluorides ($BeF_2$, $MgF_2$, $CaF_2$, $SrF_2$, $BaF_2$).

Further, the anode used in the first phase electrolysis of the present invention is composed of a substance formed by firing a mixture of more than one kind of compound selected from the group consisting of silica, silicate containing zirconium or zirconium oxide and carbon with a binder.

The features of the present invention are as follows:

(1) By the first phase electrolytic reduction of zirconium tetrachloride containing hafnium in natural ratio using an anode composed of a substance formed by firing a mixture of more than one kind of compound selected from the group consisting of silica, silicate containing zirconium or zirconium oxide and carbon with a binder zirconium trichloride with a lower hafnium content is produced at a cathode without evolution of chlorine gas.

(2) By exchanging polarities of electrodes in the second phase electrolysis, oxidation and reduction can be repeated efficiently to produce zirconium tetrachloride with a low hafnium content and zirconium trichloride with a lower hafnium content.

(3) Secondary reaction products do not almost generate and a loss of zirconium trichloride is also extremely small.

(4) In the evaporation-recovery step of zirconium tetrachloride, no huge distilling tower is required, so the whole equipment is able to be small in scale.

Thus, the present invention provides a process which can separate zirconium tetrachloride with a low hafnium content and also hafnium tetrachloride in highly concentrated state respectively with high efficiency by overcoming the problems of conventional techniques.

The present invention will be explained in more detail by the following description taken in connection with the accompanying drawing wherein:

DETAILED DESCRIPTION OF THE INVENTION

Figure 1:
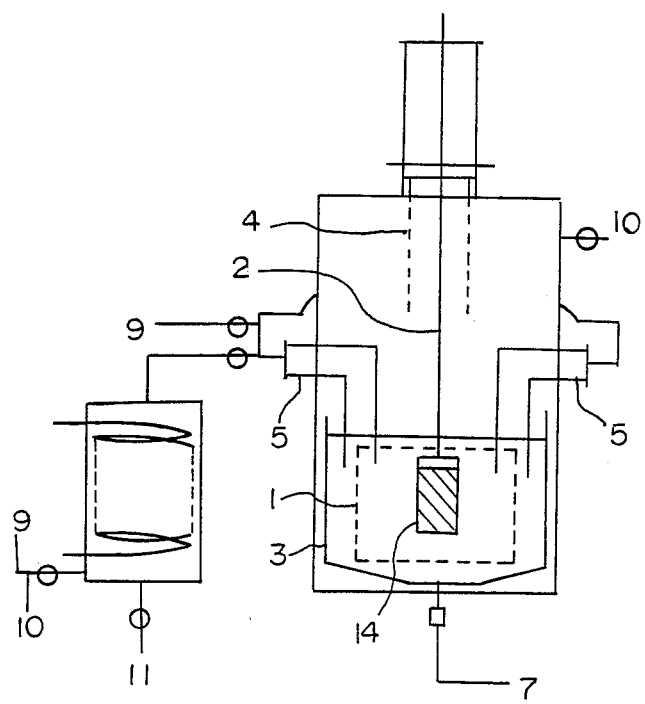
FIG. 1 shows a longitudinal sectional view of an apparatus used in an embodiment of the present invention.

Arrangement of electrode 1 is thought to be variable according to a size of electrolytic cell 3. In FIG. 1, two sets of electrodes 1(A), 1(B) along the wall of electrolytic cell 3 and center electrode 2 used as an anode in the first phase electrolysis for production of zirconium trichloride are illustrated and this center electrode 2 is composed of a substance formed by firing a mixture of carbon and zirconium oxide as described in Claim 4. In the respective upper space of electrodes 1(A), 1(B), condensing coil 4 for zirconium tetrachloride with a low hafnium content is set up.

Unseparated zirconium tetrachloride is supplied from gas introducing pipe 5 and the pressure of zirconium tetrachloride supplied is adjusted and controlled by the temperature of purified zirconium tetrachloride reservoir 6. Purified zirconium tetrachloride is in advance supplied from crude zirconium tetrachloride reservoir (not shown) through purified zirconium tetrachloride introducing part 11 and is condensed in purified zirconium tetrachloride reservoir 6. In the first phase reduction electrolysis of zirconium tetrachloride, zirconium trichloride with a lower hafnium content is produced at a cathode by electrolytic reduction of zirconium tetrachloride using either of two electrodes 1,1 shown in FIG. 1 as a cathode and center electrode 2 as an anode, thereby chlorine gas does not evolve. In the second phase electrolysis zirconium trichloride with a lower hafnium content is produced at the cathode by electrolysis of zirconium tetrachloride in the molten salt using one electrode 1(A) of electrodes on which zirconium trichloride with a lower hafnium content was produced in the first phase electrolysis as an anode and the other electrode 1(B) as a cathode and at the same time gaseous zirconium tetrachloride with a low hafnium content is evolved at the anode by electrolytic oxidation of zirconium trichloride with a lower hafnium content on the anode. When zirconium trichloride on the anode decreases, the polarities of the electrodes are exchanged and the second phase electrolysis is repeated. Zirconium tetrachloride with a low hafnium content evolving from the anode is condensed by condensing coil 4. During this repeated electrolysis hafnium tetrachloride is concentrated in the molten salt, and when a hafnium content of the concentrated hafnium tetrachloride reaches an estimated value, in which the vapor pressure of hafnium tetrachloride is less than 1/10 of a partial pressure of zirconium tetrachloride in the molten salt, the repeated electrolysis, i.e. second phase electrolysis is ceased. In the case, where the repeated electrolysis is carried out in a molten salt composed of NaCl-KCl at about 640° C., the supply of zirconium tetrachloride is stopped at the concentration of hafnium tetrachloride in the molten salt in the range from 2 to 5 wt % and the repeated electrolysis is ceased. Then the molten salt containing concentrated hafnium tetrachloride is transferred to separate vessel 7 in FIG. 4 and condensing coil 4 is pulled up as shown in the right side of FIG. 2.

The condensing coil 4 pulled up is heated to about 350° C., and zirconium tetrachloride with a low hafnium content is transported through transfer pipe 8 to reservoir (not shown).

The whole apparatus is maintained in an atmosphere of inert gases as argon, nitrogen, etc. (less than 2 atmospheric pressure) in operation. FIG. 1 shows introducing part 9 of inert gas and exhausting part 10 thereof.

The molten salt composed of alkali metal and alkaline earth metal chloride and containing zirconium tetrachloride is used as an electrolytic bath in the temperature range of 450°~750° C. and the concentration of the zirconium tetrachloride is selected to be less than 28 mol % and the equilibrium vapor pressure thereof less than 1 atmospheric pressure. During the electrolysis the pressure of purified zirconium tetrachloride already supplied to purified zirconium tetrachloride reservoir 6 is kept slightly higher than the equilibrium partial pressure of the zirconium tetrachloride in the molten salt.

Center electrode 2 used as an anode in the first phase electrolysis is composed of a substance formed by firing a mixture of silica, zirconium silicate, zirconium oxide and carbon with a binder (e.g. pitch) and is placed in a basket 14 (made of considerably more noble material than zirconium, for example, graphite, nickel, stainless steel etc.). In the electrolysis, the chlorination of above mentioned oxides occurs at the of center electrode 2 without evolution of chlorine gas.

Especially, the anode formed by firing a mixture of carbon and zirconium silicate or a mixture of carbon and zirconium oxide is effective in formation of zirconium tetrachloride.

Figure 4:
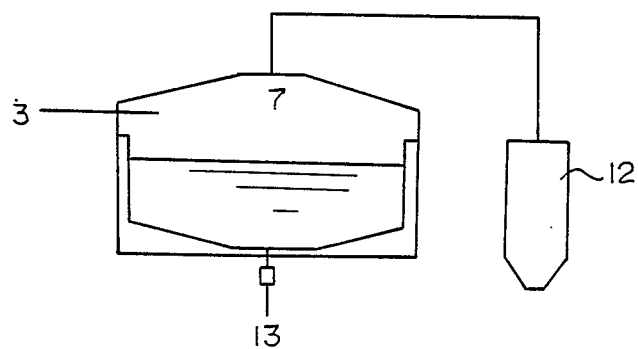
FIG. 4 shows a separate vessel to which molten salt containing concentrated hafnium tetrachloride is transferred.

After conclusion of the second phase electrolysis, the molten salt is transferred to separate vessel 7 in FIG. 4 and then is heated in a low pressure atmosphere of inert gas to evaporate remaining zirconium tetrachloride and concentrated hafnium tetrachloride therein. The evaporated substance is recovered by high hafnium tetrachloride reservoir 12. The molten salt is taken out from drain 13 to be reused as an electrolytic bath.

Figure 5A:
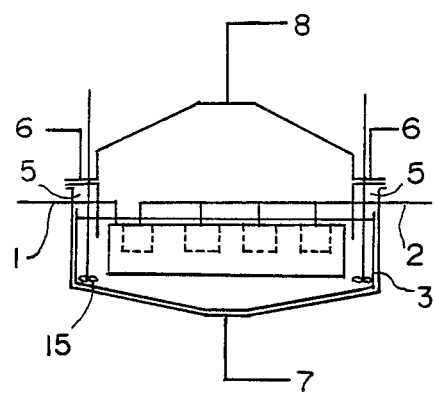
FIGS. 5(a) and 5(b) show, respectively, a longitudinal sectional view and a sectional side view of a square-shaped electrolytic cell.
Figure 5B:
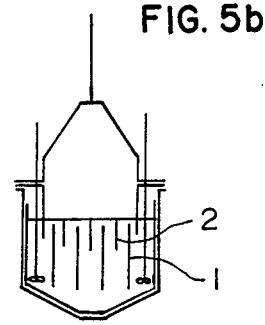
Figure 6:
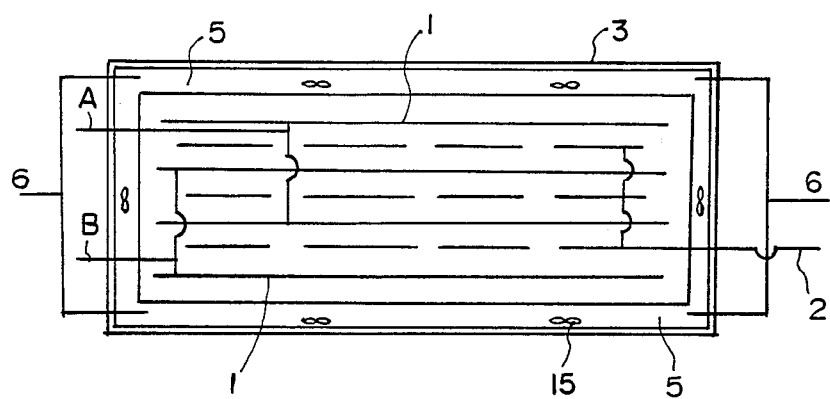
FIG. 6 shows a transverse sectional view of the square-shaped electrolytic cell.
Figure 1:
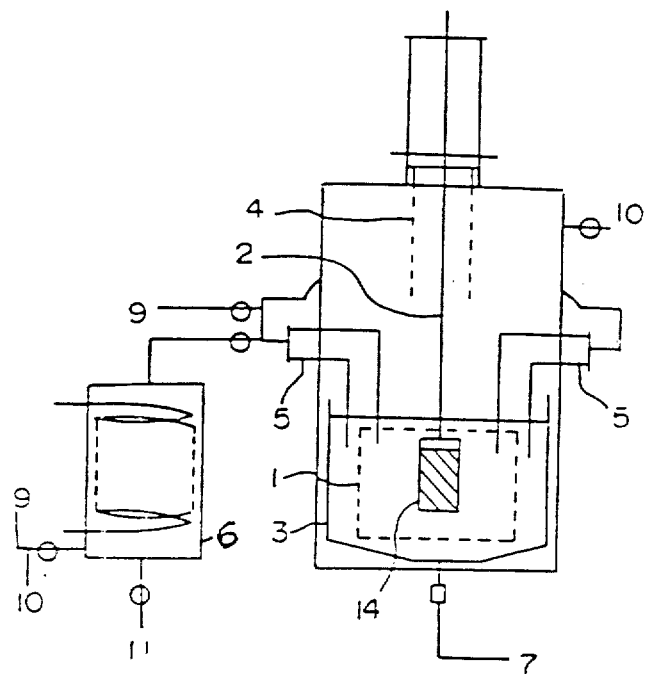

FIGS. 5(a) and 5(b) show respectively a longitudinal sectional view and a sectional side view of a square-shaped electrolytic cell used in another embodiment of the present invention and FIG. 6 shows a transverse sectional view thereof. FIG. 5(b) shows only the arrangement of the electrodes. In FIG. 6 one of each pair of electrode 1 is referred to A and the other to B. In FIG. 6, an electrode of 1 A in the third raw from the top and an electrode of 1 B in the second raw work as counter electrodes on both sides and the whole is composed of three pairs of electrode 1 having different polarities. Further, it is easy to increase a number of the pair of electrode 1. Center electrode 2 used in the first phase electrolysis exists in three raws. This center electrode 2 is considered in such a manner that it does not hinder the electrolysis in the immersion state even during the repeated electrolysis. As center electrode 2 is used an anode composed of a substance formed by firing a mixture of carbon and zirconium oxide etc. as mentioned above.

In FIGS. 5(a) and FIG. 6, agitator 15 is illustrated respectively. The electrolytic cell of this type can essentially increase A B pair of electrode 1 easily.

2. Chlorides of alkali metal and alkaline earth metal form double chlorides (e.g. $Na_2ZrCl_6$) with zirconium tetrachloride. Kipouros and Flengas detarmined vapor pressures of the double chlorides composed of alkali metal and zirconium or hafnium and showed that the vapor pressures of double chloride are lower than those of zirconium tetrachloride and hafnium tetrachloride themselves respectively and that the vapor pressure of hafnium double chloride is lower than that of zirconium double chloride. These phenomena are considered to be due to the formation of $ZrCl_6^{2-}$ ion and $HfCl_6^{2-}$ ion respectively [G. J. Kipouros and S. N. Flengas, CAN. J. CHEM. VOL. 59, p990 (1981); VOL. 61, p2 183(1983)].

In the present invention, free energies of dissolution in NaCl—KCl(50:50 mol) of zirconium tetrachloride and hafnium tetrachloride were determined from standard electrode potential values of zirconium tetrachloride and hafnium tetrachloride in NaCl-KCl(50:50 mol) molten salt [infinite dilution basis] at 700°~850° C. [T. SAKAKURA, T. KIRIHARA, DENKA, VOL. 36, p305,p320 in Japanese] and thereby respective activity in NaCl-KCl molten salt based on the solids were determined. Further, formulas of the vapor pressures of zirconium tetrachloride and hafnium tetrachloride in NaCl-KCl molten salt were determined from empirical formulas of the vapor pressures of the respective solids. Consequently, it was concluded that in the concentration of less than 28 mol %, the vapor pressure of zirconium tetrachloride became higher at the same concentration than that of hafnium tetrachloride and the difference in the vapor pressures thereof increased on the contrary to the case of zirconium tetrachloride and hafnium tetrachloride in solid phase.

The reason is considered due to higher stability of $HfCl_6^{2-}$ ion in the molten salt than that of $ZrCl_6^{2-}$ ion. Since such a difference in the vapor pressures occurs in the molten salt containing alkali or alkaline earth elements which form such complex ions as mentioned above, a separation efficiency by distillation is higher in the molten salt forming the above mentioned complex ions than in the solid mixture.

The difference of the vapor pressures of zirconium tetrachloride and hafnium tetrachloride dissolved in NaCl-KCl molten salt and those of the solids at the same temperature are shown in Table 1.

TABLE 1

Vapor pressures (mmHg) of zirconium tetrachloride and hafnium tetrachloride and those thereof dissolved in NaCl-KCl (50:50 mol) by 6 wt % at 640° C.

| $ZrCl_4$ | $HfCl_4$ | 6 wt % $ZrCl_4$ | 6 wt % $HfCl_4$ |
|---|---|---|---|
| | | mmHg | |
| 700510 | 1107870 | 757.5 | 126.3 |

The result of examples mentioned afterward shows that the equilibrium vapor pressures of zirconium tetrachloride and hafnium tetrachloride in molten salts are much lower than those of the calculated values, because the calculated values contain errors of the above mentioned free energy values and those of the standard electrode potentials, which are exterporated values from measured potentials.

As zirconium tetrachloride with a low hafnium content produced at the anode as mentioned in item 1 is in the temperature of more than the equilibrium temperature and has a vapor pressure near 1000 times as large as the equilibrium pressure of the solids as shown in Table 1, it is evident that it evolves rapidly with high speed in gaseous state.

In case of NaCl-KCl molten salt of which temperature is about 640° C., the separation efficiency becomes better when the concentration of zirconium tetrachloride is about 6 wt % and the concentration limit of hafnium tetrachloride in the molten salt is less than 5 wt %.

3. The features of the electrolytic reaction in the separation process of the present invention will be explained.

The reaction of the first phase electrolysis for producing zirconium trichloride with a lower hafnium content is for carbon anode as follows:

$$2ZrCl_4 = 2ZrCl_3 + Cl_2 \qquad [1]$$

Zirconium trichloride with a lower hafnium content is produced at the cathode and chlorine gas evolves at the anode.

But for carbon-zirconium oxide fired anode the following two reactions occur.

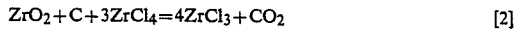
$$ZrO_2 + C + 3ZrCl_4 = 4ZrCl_3 + CO_2 \qquad [2]$$

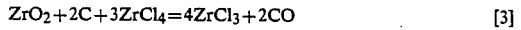
$$ZrO_2 + 2C + 3ZrCl_4 = 4ZrCl_3 + 2CO \qquad [3]$$

and

$$2CO_2 = 2CO + O_2 \qquad [4]$$

In equilibrium relation wuth the reaction [4], at 750° C. the reaction [2] and the reaction [3] occur in equivalent amount. Below this temperature the reaction [2] becomes predominant and reversely above this temperature the reaction [3] is predominant.

Therefore, at each temperature, for 1 mol of $ZrO_2$ the reaction [2] occurs by $Y/2$ and the reaction [3] by $x/2$, so $x/2 + y/2 = 1$.

The reaction with chlorine is as follows:

$$ZrO_2 + (x+y/2)C + 2Cl_2 = ZrCl_4 + xCO + y/2 CO_2 \quad [5]$$

The mol ratio of carbon and zirconium oxide in this reaction $(x+y/2)C/ZrO_2$ is determined from standard free energies of the reactions [2] and [3]. It coincides with the result of the experiment in the temperature of 600°~900° C. [SHIBATA, KIRIHARA: MEIKOSHI-REPORT, VOL. 7, p137 (1955) in Japanese].

In the anode which contains carbon in more excessive amount than the equivalent value of equation [5], chlorination of zirconium oxide is carried out to produce $ZrCl_4$, on the other hand at the cathode zirconium trichloride with a lower hafnium content is produced. When $ZrO_2$ on the anode decreases, the reaction [1] occurs. Therefore, if the anode is replaced before evolution of chlorine gas, the electrolysis may be carried out without evolution of chlorine gas. The anode used up is crushed and regenerated by adding freshly zirconium oxide, carbon and pitch.

The electrolytic reaction is for fired zirconium oxide-carbon anode as follows:

$$ZrO_2 + (x+y/2)C + 3ZrCl_4 = 4ZrCl_3 + xCO + y/2 CO_2 \quad [6]$$

The electrolytic reaction is for fired silica or silicate anode as follows:

$$SiO_2 + (x+y/2)C + 4ZrCl_4 = 4ZrCl_3 + SiCl_4 + xCO + y/2 CO_2 \quad [7]$$

Similarly to the reaction [6] zirconium trichloride with a lower hafnium content is produced at the cathode, and $SiCl_4$, CO, $CO_2$ evolve in gaseous state at the anode.

The reactions of hafnium tetrachloride correspondent to the reactions [1], [6], [7] are as follows:

$$2HfCl_4 = 2HfCl_3 + Cl_2 \quad [1']$$

$$ZrO_2 + (x+y/2)C + 4HfCl_4 = 4HfCl_3 + ZrCl_4 + xCO + y/2 CO_2 \quad [6']$$

$$SiO_2 + (x+y/2)C + 4HfCl_4 = 4HfCl_3 + SiCl_4 + xCO + y/2 CO_2 \quad [7']$$

As zirconium oxide contains 2~4 wt % of hafnium oxide, the following reaction $$HfO_2 + (x+y/2)C + 3HfCl_4 = 4HfCl_3 + xCO + y/2 CO_2 \quad [8]$$

is thought ocour, but the probability of this reaction is smaller than that of the reaction because the concentration of $ZrO_2$ is much higher than that of $HfO_2$ [6'].

In the second phase repeated electrolysis, the electrolytic reaction of equation [1] is as follows:

$$ZrCl_4 = ZrCl_3 + Cl$$

At the cathode zirconium trichloride is produced and chlorine gas evolving at the anode reacts with zirconium trichloride on the anode, thus zirconium tetrachloride is manufoctured at the anode. Namely, the reactions at the anode are as follows:

$$Cl^- = Cl + e$$

$$Cl + ZrCl_3 = ZrCl_4$$

at this time chlorine gas does not evolve.

The electrolytic reaction of hafnium corresponding to these reactions is equation [1'].

$$HfCl_4 = HfCl_3 + Cl$$

It will be explained for NaCl-KCl (50:50 mol) molten salt that the electrolysis of zirconium tetrachloride can be carried out under the condition that hafnium tetrachloride is not reduced to hafnium trichloride.

Standard electrode potentials of zirconium tetrachloride and hafnium tetrachloride in NaCl-KCl (50:50 mol) molten salt were determined experimentally and at the temperature below 850° C. the following equations were already obtained [T. SAKAKURA and T. KIRIHARA, DENKA, VOL. 36, p305, p320, 1968 in Japanese].

For $HfCl_3$, $HfCl_4$ $$\overset{\circ}{E}iHf/Hf_3 = -(2.97 - 8.5 \times 10^{-4}T)$$

$$\overset{\circ}{E}iHf/Hf_4 = -(2.7 - 6.1 \times 10^{-4}T)$$

For $ZrCl_3$, $ZrCl_4$ $$\overset{\circ}{E}iZr/Zr_3 = -(2.68 - 6.9 \times 10^{-4}T)$$

$$\overset{\circ}{E}iZr/Zr_4 = -(2.477 - 6.52 \times 10^{-4}T),$$

where $\overset{\circ}{E}i$ indicates a standard electrode potential based on infinte dilution, and European convention is used for the sign of electrode potentials.

Using the standard potential values as mentioned above and the standard free energy values of $ZrO_2$, $SiO_2$, $HfO_2$, $SiCl_4$ and $CO_2$ the differences of standard potentials of the electrolytic reactions of corresponding equations [1] and [1'], [6] and [6'], [7] and [7'], and [6] and [8] at 450° C. and 600° C. are shown in Table 2.

However, these potential values were determined on the assumption that in the range of these temperatures $CO_2$ is formed mainly because of $Y/2 > x$, $Y/2 = 1$.

TABLE 2

The differences of the standard electrode potentials in the electrolytic reactions of $ZrCl_4$ and $HfCl_4$ in NaCl-KCl (50:50 mol)

| temperature | [1']-[1] | [6']-[6] | [7']-[7] | [8]-[6] |
|---|---|---|---|---|
| | volt | | | |
| 450° C. | −0.52 | −0.52 | −0.52 | −0.32 |
| 600° C. | −0.62 | −0.62 | −0.62 | −0.42 |

The values of Table 2 show that in the first phase electrolysis and the second phase repeated electrolysis, there exists a potential difference which is enough to separate hafnium trichloride from zirconium trichloride. As this value is a difference of the standard potentials, it is a value corresponding to a case where $ZrCl_4$ or HfCl$_4$ in NaCl-KCl is assumed to exsist in 100%. Therefore, as even at the end of the practial electrolysis the concentration of ZrCl$_4$ is higher than that of HfCl$_4$, the difference of the potentials is further larger than that shown in Table 2. Consequently, when in actual case the electrolysis is carried out at a potential of less than the electrolytic potentials at which the reactions of the equations of [1'], [6'] and [7'] occur, only almost pure zirconium trichloride can be yielded at the cathode.

The present invention will be explained more concretely by the following examples. These examples do not limit the scope of the present invention.

EXAMPLE 1

Figure 3:
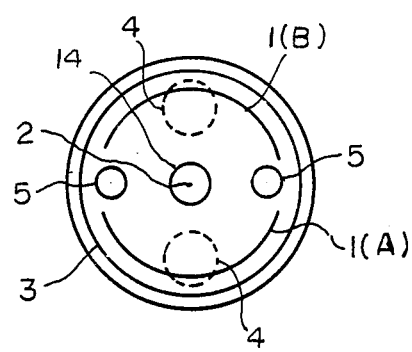
FIG. 3 shows a transverse sectional view of electrolytic cell 3.

By using a laboratory scale round-shaped electrolytic cell as shown in FIG. 1 FIG. 3 and the center electrode 2 composed of a substance formed by firing a mixture of zirconium oxide and carbon and pitch in ratio of 10:2:0.6 wt % in pellet form in diameter about 15×10 mm, which is equivalent with about 3 fold amount of the first phase electrolysis, placed in cylindrical graphite-made basket 14 is used as an anode. Then dissolving 1 wt % of KF and 6 wt % of zirconium tetrachloride in a molten salt, NaCl-KCl (50:50 mol) and keeping the concentration of the latter at 6 wt % by supplying zirconium tetrachloride with hafnium of 3 wt % from gas introducing pipe 5, the first phase electrolysis of zirconium tetrachloride is carried out first to 12 Ah between electrode 1 (A) and center electrode 2 and next to 2 Ah between electrode 1 (B) and center electrode 2, to deposit zirconium trichloride on the respective electrode.

Next, in the second phase electrolysis in which the current is kept at 5A, the electrolysis of zirconium tetrachloride is carried out first to 10 Ah by using electrode 1 (B) as a cathode and electrode 1 (A) as an anode, next to 10 Ah by using electrode 1 (A) as a cathode, namely to every 10 Ah for 5 times (about 10 hrs) by exchanging polarities of electrodes 1 (A), 1 (B) alternately. Consequently zirconium tetrachloride with 100 ppm of hafnium was obtained in an average rate of 24 g/hr. The consumption amount of zirconium oxide used in center electrode 2 was almost consistent with an amount calculated from the reaction equation [5]. The consumption amount of carbon was larger by 3% than the calcurated value. Further, chlorine gas did not evolve during the electrolysis.

EXAMPLE 2

By using an electrolytic cell similar to that of example 1 and a molten salt, NaCl-KCl (45:55 mol) in which 6 wt % of zirconium tetrachloride is dissolved and the concentration thereof is kept at 6 wt % in a similar manner as example 1 and center electrode 2 composed of a substance formed by firing a mixture of ZrSiO$_4$ and carbon and pitch in a ratio of 10:2.6:0.8 wt % in pellet form placed with 3 fold amount of the first phase electrolysis equivalent in a basket 14 similar to example 1 as an anode, the first phase electrolysis of zirconium tetrachloride is carried out similarly to example 1. At this time, silicon tetrachloride is exhausted from argon exhaust pipe 10. The second phase electrolysis is carried out similarly to example 1. Consequently zirconium tetrachloride with hafnium of 100 ppm was obtained in an average rate of 26 g/hr.

EXAMPLE 3

Figure 2:
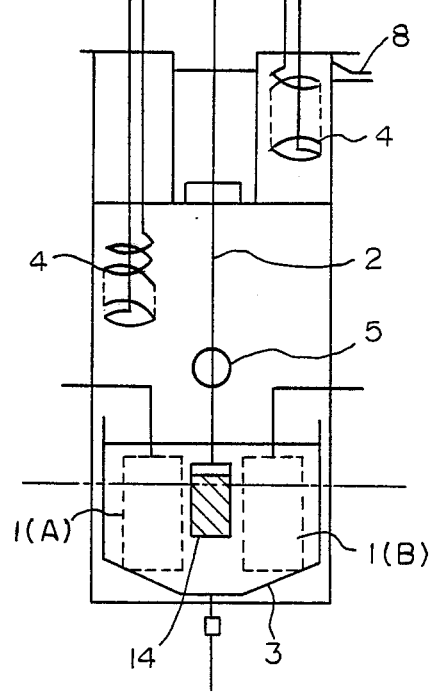
FIG. 2 shows a sectional side view of electrolytic cell 3 of FIG. 1.

By using a round-shaped electrolytic cell as shown in FIG. 1~FIG. 3 and a molten salt, NaCl-KCl (45:55 mol) in which zirconium tetrachloride with hafnium of 2 wt % is dissolved and the concentration thereof is kept at 10 wt % by supplying it from gas introducing pipe 5 and center electrode 2 composed of a substance formed by firing a mixture of zirconium oxide and carbon and pitch in a ratio similar to example 1 placed in molybden-made basket 14 as a cathode and electrodes 1,1 composed of graphite plate, the first phase electrolysis of zirconium tetrachloride is carried out first to 1.8 Ah between electrode 1 (A) as a cathode and center electrode 2 and next to 0.2 Ah between electrode 1 (B) as a carhode and center electrode 2.

Next, the second phase electrolysis of zirconium tetrachloride is carried out first to 15 Ah by using electrode 1 (B) as a cathode and next to 15 Ah by using electrode 1 (A) as a cathode, namely to every 15 Ah for 20 times by exchanging polarities of electrodes 1 (A), 1 (B) alternately. Then, the supply of zirconium tetrachloride from gas introducing pipe 5 is stopped and under argon atmosphere zirconium tetrachloride condensing pipe 4 is pulled up and the condensed zirconium tetrachloride with a low hafnium content is heated to be evaporated and transferred to a reservoir (not shown) through transferring pipe 8. In the reservoir, 125 g of zirconium tetrachloride with hafnium of less than 100 ppm was recovered.

Next, under argon atmosphere the electrolysis is carried out first to 1.5 Ah by using electrode 1 (B) as a cathode and next to about 1.5 Ah by using electrode 1 (A) as a cathode and further to about 1 Ah by exchanging polarities of the electrodes.

At this time, zirconium tetrachloride recovered in condensing pipe 4 is also transferred to a reservoir (not shown) by transferring pipe 8. Then inserting new condensing pipe 4 the molten salt is heated to 950° C. in a low pressure argon (about 1 mmHg). Consequently 4 g of hafnium tetrachloride with hafnium of 78 wt % was obtained in condensing pipe 4.

EXAMPLE 4

By using a square-shaped electrolytic cell with 3 pairs of electrode 1 as shown in FIG. 5 and FIG. 6 and a molten salt, NaCl-MgCl-KCl (20:40:40 mol) at 600° C. and center electrode 2 composed of a substance formed by firing zirconium oxide carbon pellet similar to example 1 placed in nickel-made basket 14, the first phase electrolysis of zirconium tetrachloride is carried out first to 30 Ah by using electrode 1 (A) as a cathode and next to 6 Ah by using electrode 1 (B) as a cathode. Further, after center electrode 2 is pulled up from the molten salt, the second phase electrolysis is carried out at 15A by exchanging polarities of electrodes 1 (A), 1 (B) at every 1 hr for 8 times alternately. Consequently, 600 g of zirconium tetrachloride with hafnium of 100 ppm was obtained.

EXAMPLE 5

By using a laboratory scale round-shaped electrolytic cell as shown FIG. 1~FIG. 3 and center electrode 2 composed of a substance formed by firing a mixture of silica of less than 300 mesh and carbon and pitch in ratio of 10:1:0.4 wt % in pellet form placed in nickel-made basket 14 as a cathode and a molten salt, NaCl-KCl (45:55 mol) in which the concentration of zirconium tetrachloride is kept at 6 wt % by supplying zirconium tetrachloride with hafnium of 2 wt % from gas introducing pipe 5, the first phase electrolysis of zirconium tetrachloride is carried out first to 1.3 Ah by using center electrode 2 as an anode and electrode 1 (A) as a cathode and next to 1.2 Ah by using electrode 1 (B) as a cathode to be concluded.

During this time, silicon tetrachloride in argon gas exhausted from inert gas exhaust pipe 10 is cooled and recovered. After center electrode 2 is pulled up to the upper part of the molten salt, the second phase electrolysis of zirconium tetrachloride is carried out to every 1 Ah for 10 times by exchanging polarities of electrodes 1 (A) and 1 (B) alternately. Consequently 40 g of zirconium tetrachloride with hafnium of 100 ppm was recovered in condensing pipe 4.

EFFECT OF THE INVENTION

The present invention shows the following effects by adopting the above mentioned constitution, namely a combination of the molten salt electrolysis and the exchange of polarities of the electrodes.

(1) Zirconium and hafnium can be respectively separated and recovered with high efficiency. A hafnium content of zirconium tetrachloride separated is remarkably low and is able to reduce less than 100 ppm. A zirconium content of hafnium tetrachloride separated is also able to reduce to less than 25 wt %.

(2) In the present invention, the problems in conventional techniques due to the use of organic solvent or reducing agent do not exist, and quite a few secondary products including chlorine gas generate and the loss of zirconium tetrachloride is extremely small. Moreover, since no huge distilling tower for zirconium tetrachloride and hafnium tetrachloride is required, the scale of the whole equipment is comparably small.

What is claimed is:

1. A process for separation of hafnium tetrachloride from zirconium tetrachloride comprising the following steps:
    (a) dissolving zirconium tetrachloride containing hafnium tetrachloride in natural ratio in a molten salt,
    (b) producing zirconium trichloride containing a lower hafnium content than that of said zirconium tetrachloride at a cathode by electrolytic reduction of said zirconium tetrachloride in said molten salt using a substance formed by firing a mixture of more than one kind of compound selected from the group consisting of silica, silicate containing zirconium or zirconium oxide and carbon with a binder as an anode.

2. A process for separation of hafnium tetrachloride from zirconium tetrachloride as claimed in claim 1, wherein said molten salt is composed of alkali metal chlorides (LiCl, NaCl, KCl, RbCl, CsCl), alkaline earth chlorides ($BeCl_2$, $MgCl_2$, $CaCl_2$, $SrCl_2$, $BaCl_2$), and/or alkali metal fluorides (LiF, NaF, KF, RbF, CsF), alkaline earth fluorides ($BeF_2$, $MgF_2$, $CaF_2$, $SrF_2$, $BaF_2$).

3. A process for separation of hafnium tetrachloride from zirconium tetrachloride as claimed in claim 1, wherein said anode in said molten salt electrolysis is composed of a substance formed by firing a mixture of more than one kind of compound selected from the group consisting of silica, silicate containing zirconium or zirconium oxide and carbon with a binder.

4. A process for separation of hafnium tetrachloride from zirconium tetrachloride comprising the following steps:
    (a) dissolving zirconium tetrachloride containing hafnium tetrachloride in natural ratio in a molten salt,
    (b) producing zirconium trichloride containing a lower hafnium content than that of said zirconium tetrachloride at a cathode by the first phase electrolytic reduction of said zirconium tetrachloride in said molten salt using a substance formed by firing a mixture of more than one kind of compound selected from the group consisting of silica, silicate containing zirconium or zirconium oxide and carbon with a binder as an anode under maintenance of an initial concentration of said zirconium tetrachloride by supplying said tetrachloride to said molten salt,
    (c) next, using as an anode said cathode, on which said zirconium trichloride was produced in the former electrolytic reduction, and another cathode,
    (d) producing said zirconium trichloride with a lower hafnium content at said another cathode by the second phase electrolytic reduction of said zirconium tetrachloride in keeping cocentration of said zirconium tetrachloride in said molten salt by supplying said tetrachloride in a similar manner as in the first phase electrolytic reduction and at the same time evolving gaseous zirconium tetrachloride with a high pressure at the anode by oxidizing said zirconium trichloride which was produced in the former electrolytic reduction,
    (e) recovering said evolved zirconium tetrachloride as zirconium tetrachloride with a low hafnium content,
    (f) further producing said zirconium trichloride with a lower hafnium content at the cathode and said zirconium tetrachloride with a low hafnium content at the anode by exchanging polarities of said cathode and said anode when said zirconium trichloride on said anode decreases,
    (g) subsequently repeating continuously the second phase electrolytic reduction similar to above,
    (h) on the other hand, transferring said hafnium tetrachloride highly concentrated in said molten salt to a separate vessel at the end of said second phase electrolytic reduction when a vapor pressure thereof reaches an expected value less than about 1/10 of an equilibrium pressure of said zirconium tetrachloride in said molten salt at the temperature of said molten salt, and
    (i) separating said highly concentrated hafnium tetrachloride from said molten salt by temperature rise of said molten salt transferred already to said separate vessel.

* * * * *

UNITED STATES PATENT OFFICE
CERTIFICATE OF CORRECTION

Page 1 of 4

Patent No. 4,925,537          Dated May 15, 1990

Inventor(s) Tomoo Kirihara, Ippei Nakagawa, Yoshinobu Seki, Yutaka Honda, Yasuo Ichihara It is certified that error appears in the above-identified patent and that said Letters Patent is hereby corrected as shown below:

The title page should be deleted to appear as per attached title page.

Figure 1 should be deleted to be replaced with figure 1, as shown on the attached sheet.

Column 1, line 46, correct "ratio".

Column 3, line 2, after the first "zirconium" add --,--;

line 54, change "FIG. 1" to --FIGS. 1-3--;

line 59, correct "substance".

Column 4, line 64, change "silicate," to --silicate or--.

Column 5, line 1, delete "of".

Column 8, line 4, correct "manufactured".

Column 10, line 14, change "15" to --1.5--;

line 15, change "15" to --1.5--;

United States Patent [19]

Kirihara et al.

[11] Patent Number: 4,925,537
[45] Date of Patent: May 15, 1990

[54] PROCESS FOR SEPARATION OF HAFNIUM TETRACHLORIDE FROM ZIRCONIUM TETRACHLORIDE AND ELECTRODE

[75] Inventors: Tomoo Kirihara, Hirakocho-Higashi; Ippei Nakagawa, Aichi; Yoshinobu Seki, Ibaraki; Yutaka Honda, Ibaraki; Yasuo Ichihara, Ibaraki, all of Japan

[73] Assignee: Mitsubishi Nuclear Fuel Company, Ltd., Tokyo, Japan

[21] Appl. No.: 330,893

[22] Filed: Mar. 31, 1989

[30] Foreign Application Priority Data

Apr. 1, 1988 [JP] Japan ................... 63-80416

[51] Int. Cl.$^5$ ................... C25B 1/26; C25B 11/04
[52] U.S. Cl. ................... 204/61; 204/291; 204/294
[58] Field of Search ................... 204/61, 64 T, 291, 294

[56] References Cited

U.S. PATENT DOCUMENTS

| | | | |
|---|---|---|---|
| 2,941,931 | 6/1960 | Dean | 204/61 |
| 3,003,890 | 10/1961 | Dean | 204/61 X |
| 3,600,284 | 8/1971 | Martinez | 204/64 T X |
| 4,857,155 | 8/1989 | Kirihara et al. | 204/61 |

Primary Examiner—Donald R. Valentine
Attorney, Agent, or Firm—James Creighton Wray

[57] ABSTRACT

A process for separation of hafnium tetrachloride from zirconium tetrachloride and electrode is disclosed. Zirconium tetrachloride containing hafnium tetrachloride in natural ratio dissolved in a molten salt is reduced in the first phase electrolysis using an anode composed of a substance formed by firing a mixture of more than one kind of compound selected from the group consisting of silica, silicate containing zirconium or zirconium oxide and carbon with a binder under maintenance of an initial concentration of the zirconium tetrachloride in order to produce zirconium trichloride containing a hafnium content lower than that of the zirconium tetrachloride at a cathode. Next, by using the former cathode as an anode and another cathode in the second phase electrolysis the zirconium tetrachloride is further reduced to yield zirconium trichloride of a lower hafnium content at another cathode and evolve on the anode gaseous zirconium tetrachloride having a high pressure by oxidizing the zirconium trichloride produced in the first phase electrolysis. The evolved zirconium tetrachloride is recovered as zirconium tetrachloride with a low hafnium content. Further, the zirconium tetrachloride with a low hafnium content and the zirconium trichloride with a lower hafnium content are produced by exchanging polarities of the cathode and the anode when the zirconium trichloride on the anode decreases. The second phase electrolysis is carried out repeatedly. After hafnium tetrachloride is concentrated to an expected value in the molten salt in the above mentioned electrolysis, the molten salt is transferred to a separate vessel and is heated to evaporate the tetrachloride highly concentrated hafnium. Thus, zirconium tetrachloride and hafnium tetracholoride are respectively separated with high efficiency. A hafnium content of zirconium tetrachloride separated is able to reduce to less than 100 ppm, and a zirconium content of hafnium tetrachloride separated is also reduced to less than 25 wt %.

4 Claims, 3 Drawing Sheets

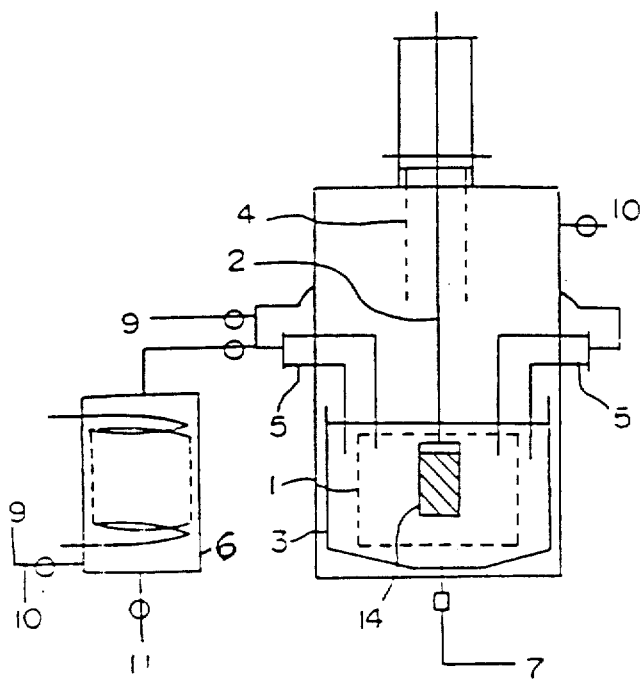

UNITED STATES PATENT AND TRADEMARK OFFICE
CERTIFICATE OF CORRECTION

PATENT NO. : 4,925,537
DATED : May 15, 1990
INVENTOR(S) : Tomoo Kirihara, et al.

It is certified that error appears in the above-indentified patent and that said Letters Patent is hereby corrected as shown below:

Column 10, line 16, change "15" to --1.5--.

Signed and Sealed this

First Day of February, 1994

Attest:

BRUCE LEHMAN

*Attesting Officer*        *Commissioner of Patents and Trademarks*